United States Patent [19]
Schure et al.

[11] Patent Number: 6,117,326
[45] Date of Patent: Sep. 12, 2000

[54] CAPILLARY ELECTROCHROMATOGRAPHY SEPARATION MEDIA

[75] Inventors: Mark Richard Schure, Blue Bell; Willie Lau, Ambler, both of Pa.

[73] Assignee: Rohm and Haas Company, Philadelphia, Pa.

[21] Appl. No.: 09/282,127

[22] Filed: Mar. 31, 1999

Related U.S. Application Data

[60] Provisional application No. 60/090,796, Jun. 26, 1998.

[51] Int. Cl.$^7$ .................................................. B01D 15/08
[52] U.S. Cl. ...................... 210/635; 210/656; 210/198.2; 204/451; 204/455
[58] Field of Search ...................... 204/451, 452, 204/453, 455, 601, 602, 603, 604, 605; 210/635, 656, 659, 198.2

[56] References Cited

U.S. PATENT DOCUMENTS

| | | | |
|---|---|---|---|
| 4,384,096 | 5/1983 | Sonnabend | 526/313 |
| 5,164,055 | 11/1992 | Dubrow | 204/455 |
| 5,266,646 | 11/1993 | Eisenhart et al. | 525/301 |
| 5,348,658 | 9/1994 | Fuchs | 210/635 |
| 5,370,777 | 12/1994 | Guttman | 204/455 |
| 5,534,123 | 7/1996 | Bashkin et al. | 204/455 |
| 5,552,028 | 9/1996 | Madabhushi | 204/455 |
| 5,593,559 | 1/1997 | Wiktorowicz | 204/455 |
| 5,633,129 | 5/1997 | Karger et al. | 435/6 |
| 5,647,979 | 7/1997 | Liao et al. | 210/198.2 |
| 5,728,282 | 3/1998 | Bashkin | 204/455 |
| 5,759,369 | 6/1998 | Menchen | 204/455 |
| 5,858,241 | 1/1999 | Dittmann et al. | 210/656 |
| 5,916,426 | 6/1999 | Madabhushi | 204/451 |
| 5,948,227 | 9/1999 | Dubrow | 204/455 |
| 6,001,232 | 12/1999 | Chu | 204/455 |

OTHER PUBLICATIONS

"Capillary Electrochromatography: Analysis of Polycyclic Aromatic Hydrocarbons", Chao Yan, Rajeev Dadoo, Hui Zhao, and Richard N. Zare; Anal. Chem. 1995, 67, 2026–2029.

"Electrically driven open–tubular liquid chromatography", G. J. M. Bruin, P. P. H. Tock, J. C. Kraak and H. Poppe; Journal of Chromatography, 517 (1990) 557–572.

A Stationary Phase for Open Tubular Liquid Chromatography and Electrochromatography Using Sol–Gel Technology, Yong Guo and Luis A. Colon; Analytical Chemistry, vol. 67, No. 15, Aug. 1, 1995, 2511–2516.

Retention behaviour of polycyclic aromatic hydrocarbons on a liquid–crystal bonded phase in reversed–phase liquid chromatography, Kiyokatsu Jinno, Yoshihiro Saito and Renu Malhan nee Chopra; Journal of Chromatography, 557, 1991, 459–468.

Effect of Micelles and Mixed Micelles on Efficiency and Selectivity of Antibiotic–Based Capillary Electrophoretic Enantioseparations, Kimber L. Rundlett and Daniel W. Armstrong; Anal. Chem. 1995 67, 2088–2095.

Preparation of Continuous Beds Derivatized with One–Step Alkyl and Sulfonate Groups for Capillary Electrochromatography, Jia–Li Liao, Nong Chen, Christer Ericson, and Stellan Hjerten; Anal. Chem. 1996, 68,3468–3472.

Chuzo Fujimoto, et al., *Analytical Chemistry*, vol. 68, pp. 2753–2757 (1996).

*Primary Examiner*—Ernest G. Therkorn
*Attorney, Agent, or Firm*—Thomas J. Howell

[57] ABSTRACT

The present invention provides for the convenient preparation, purification, use and re-use of capillary electrochromatography columns that employ polymer gel materials as the separation media. The problems associated with employing crosslinked polymer gels is overcome through the use of physically entangled polymer gels, which comprise, as polymerized units: 1) 5% to 80% by weight of an ionizable monomer; 2) 0.1% to 50% by weight of a monomer containing a retentive ligand; and 3) 10% to 80% by weight of a nonionic monomer.

4 Claims, 6 Drawing Sheets

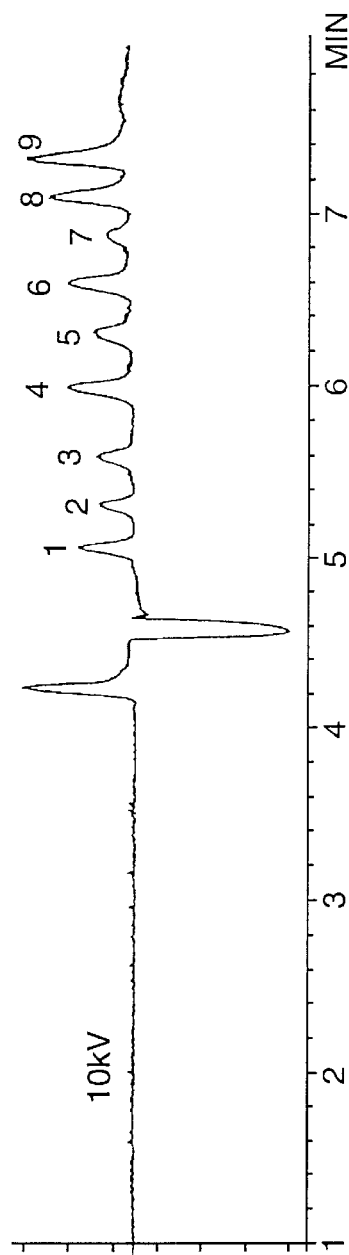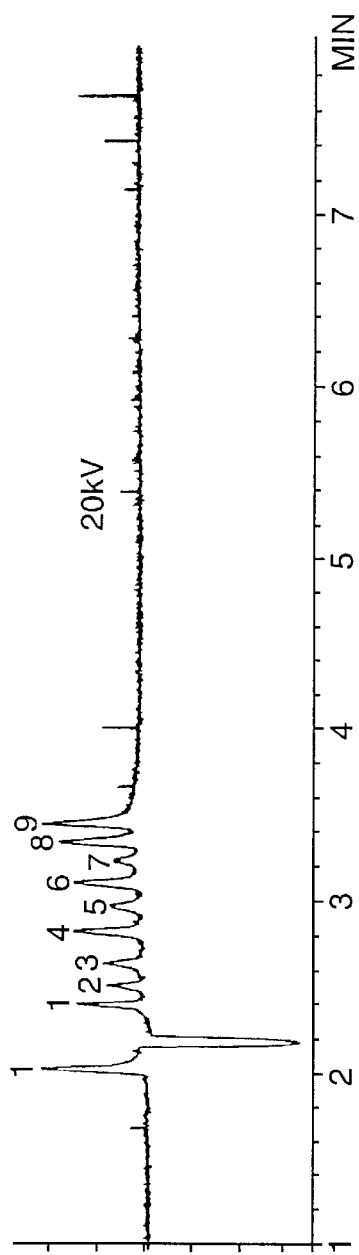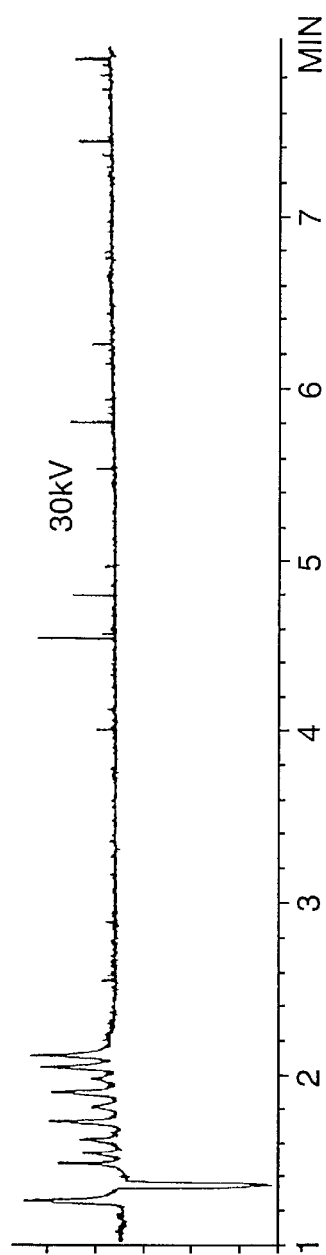
FIG. 6(A)
FIG. 6(B)
FIG. 6(C)

CAPILLARY ELECTROCHROMATOGRAPHY SEPARATION MEDIA

This application claims the benefit of U.S. Provisional Application No. 60/090,796 filed Jun. 26, 1998.

BACKGROUND

Electrochromatography ("EC") is one of many variations of the electrophoresis separation technique. In EC, retention of solute by some form of stationary retentive phase provides the selectivity for separation as is the case for a normal chromatographic separation. However, in EC, the fluid-mediated transport of solute is through electroosmotic flow, which is provided by the support material that holds the retentive phase. The interest in EC stems from the belief that zone broadening is generally smaller because the flow profile is uniform, and that flow can be achieved with smaller particles. Uniform flow profiles and smaller particles lead to higher resolution, which is very desirable in complex analysis or in situations where the zone width can be compromised to run at faster analysis time. This is in contrast to the parabolic flow profile found in pressure-driven flow from a pump-driven packed bed chromatographic system. In pressure-driven systems, small particles can cause huge pressure drops in the packed bed which leads to pump fatigue and shorter column lifetime.

In EC, like other techniques that work by electrophoresis and/or electroosmosis, a current is sent through a column to enact transport of molecules. This current is proportional to the cross-sectional area of the column through which transport takes place. Capillary-sized columns are preferred in EC because a low cross-sectional column area produces the lowest amount of heat (which can destroy the molecules to be separated, and reduce the separation efficiency due to formation of viscosity gradients), and further because the high surface area to volume ratio of capillaries allows heat to be dissipated at a faster rate as compared with larger sized columns.

The EC technique has been implemented in a number of ways in capillary systems. For example, Yan, C., et al. *Anal. Chem.* 1995, 67, 2026–2029 describe the use of capillaries packed with small particles. This technique requires the capillary to be packed with a solid phase such as beads, which is difficult to do in a capillary, particularly achieving uniform density. Furthermore, supporting frits are required to hold the beads in place. These frits are difficult to make and often generate air bubbles during the separation.

Capillaries used in the open-tube configuration are described in Bruin, G. J. M., et al., *J. Chrom.* 1990, 517, 557–572. The disadvantages of this technique include the lack of abundant retentive phase per column length and small performance increase as compared with pressure-driven flow using a micro LC column.

The packed capillary configuration has recently been augmented by new retentive phases. In situ polymerized sol-gel media are described by Guo, Y., Colon, L. A. *Anal. Chem.* 1995, 67, 2511–2516; in situ polymerized polyacrylamide gel media are described by Fujimoto, C. et al., *Anal. Chem.* 1996, 68, 2753–2757; and in situ polymerized hydrophobic alkyl (meth)acrylate gel media are described in U.S. Pat. No. 5,647,979 to Liao et al. These gel media have various levels of chromatographic performance and require different levels of expertise for preparation. Furthermore, these preparations are inconvenient and impractical. The in situ polymerization takes a substantial amount of time, and subsequent purification must also be done in situ—taking yet more substantial time. The preparation of in situ materials makes purification extremely difficult due to mass transport limitations of diffusion and convection in porous materials. Thus, EC baseline stability suffers in these gel media systems.

In addition, because these gel systems are prepared in situ, their use depends on the ease of cleaning the freshly prepared capillary prior to stable analytical utilization. Because the pore space is small in these systems, they are susceptible to clogging. Once clogged, the lifetime of the capillary is reached and a new capillary must be used. Irreversible adsorption will reduce the electroosmotic velocity for this type of EC. This is contrasted to normal pressure-driven flow LC where the driving velocity is not affected by irreversible adsorption.

Accordingly, a need exists to provide for the convenient preparation, purification, use and re-use of EC columns.

STATEMENT OF INVENTION

The current invention offers a marked improvement in the preparation and use of EC columns. We have discovered that certain non-crosslinked polymers, held together through physical entanglement rather than crosslinking, provide a remarkably efficient and convenient EC separation media. The polymers of the current invention need not be prepared in situ, and purification and testing can be done external to the preparation of the column. Thus, a significant amount of time is taken out of the user's method development. Additionally, when the column becomes clogged or damaged (as routinely happens in microseparations) the gel is easily replenished in the capillary and down time is minimal. The separations achieved using the present invention are notable because of the convenience, extremely high resolution, column reusability, almost no solvent volume, and extremely high speed.

The separation media of the current invention is a polymer solution containing at least one substantially non-crosslinked polymer comprising:
 (i) from about 5 to 80 weight percent of at least one ethylenically unsaturated monomer containing an ionizable functional group;
 (ii) from about 0.1 to 50 weight percent of at least one ethylenically unsaturated monomer containing a retentive ligand side-chain comprising an organic moiety of at least $C_3$; and
 (iii) from about 10 to 80 weight percent of least one ethylenically unsaturated monomer containing no ionizable functional group.

Other aspects of the current invention include (1) an EC column comprising a capillary-sized vessel and the above polymer solution operatively dispersed in said vessel; and (2) a kit containing at least one capillary-sized vessel, and at least one of the above polymer solutions.

By "capillary-sized vessel" we mean a small inner bore diameter (less than 300 microns) tube. While typically cylindrical in shape, the capillary-sized vessel can take any other shape as long as some segment of the tube cross-section is less than 300 microns. Capillaries are typically made of fused silica glass, but can be manufactured from any material suitable for use in chemical analysis applications.

By the use of the general term "(meth)acrylate" we intend to include esters of acrylic acid as well as esters of methacrylic acid.

BRIEF DESCRIPTION OF DRAWINGS

FIGS. 6A–6C illustrate the effect of field strength on the electrochromatographic separation of a mixture of polycyclic aromatic hydrocarbons.

DETAILED DESCRIPTION OF INVENTION

Figure 1:
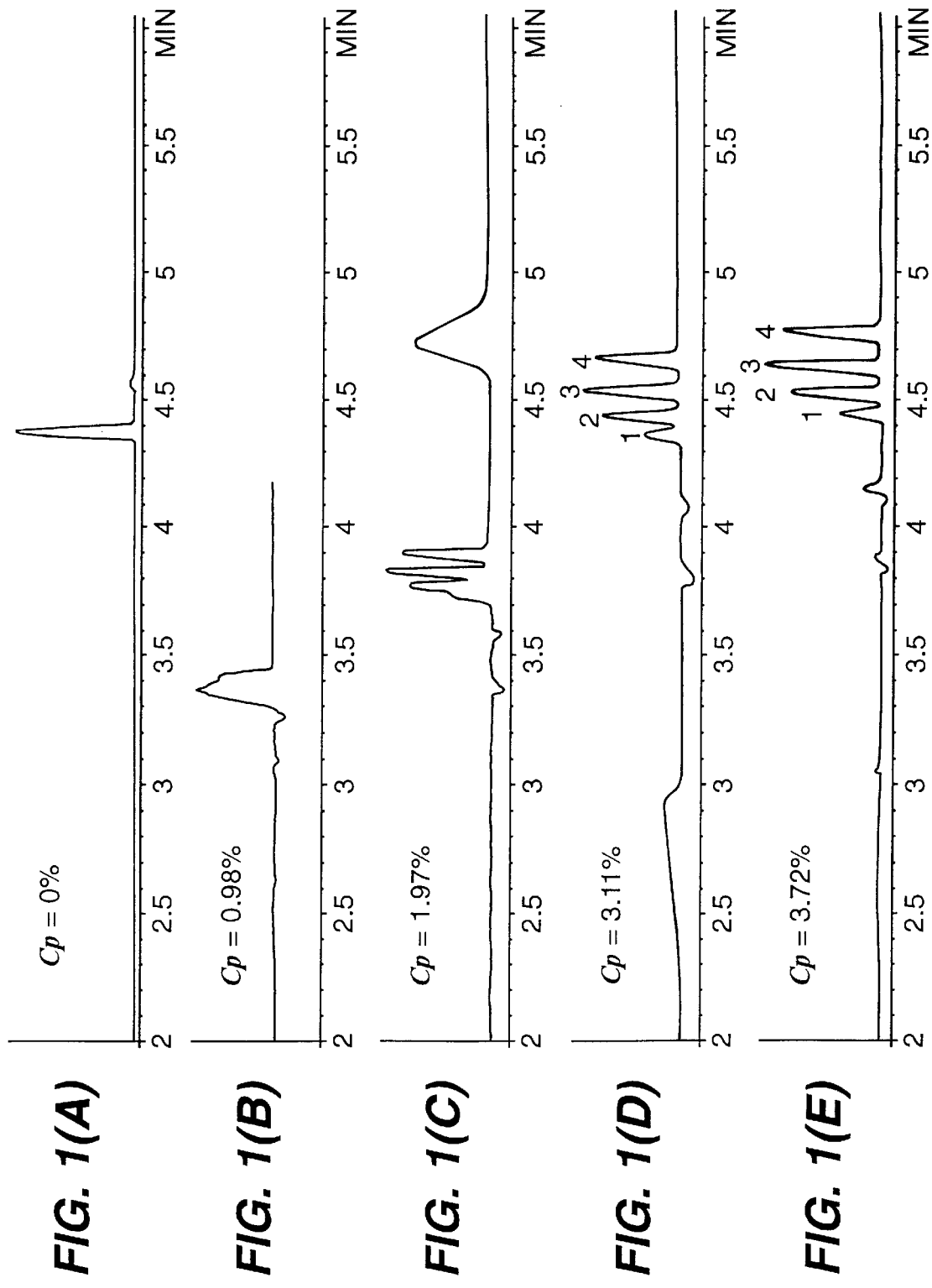
FIGS. 1A–1E illustrate the electrochromatographic separation of four solutes using varying concentrations of polymer separation medium within the scope of the present invention.

We have discovered that certain polymers are ideally suited for implementation of capillary electrochromatography. The polymers of the present invention are non-crosslinked polyelectrolytes with grafted hydrophobic (retentive) ligands. Such polymers are known to be useful in the art of rheology modification in aqueous systems, where they are generally known as associative thickeners. Polymers of this type are described in prior art references including U.S. Pat. No. 5,266,646 and U.S. Pat. No. 4,384,096.

The rheological application mechanism is established by allowing the acid backbone of the polymer to impart water solubility and the grafted hydrophobe to form aggregates. Such intermolecular interactions drive an increase in solution viscosity through the formation of a transient polymer network. For the case of electrochromatography, typically an acid backbone is used as charge center for associated cations so that an electroosmotic flow can be established when an electric field is applied. The grafted hydrophobes act as the retentive center.

Since the length and molecular weight of these hydrophobically modified polyelectrolytes are large, the polymer can be pumped into the capillary as an entangled gel. Generally, polymers with molecular weights of 10,000 to 50 million Daltons are useful in the present invention. Due to entanglement and possibly some hydrogen bonding with the capillary wall, no frit system need be utilized for this form of EC. The synthesis of these polymers is external to the capillary promoting a minimum of capillariy conditioning. This has a distinct advantage in both time and convenience.

The polymer compositions of this invention may be prepared by conventional polymerization techniques, such as emulsion polymerization with free-radical producing initiators. The free-radical producing initiators typically are peroxygen compounds including inorganic persulfate compounds such as ammonium persulfate, potassium persulfate, and sodium persulfate; peroxides such as hydrogen peroxides; organic hydroperoxides such as cumene hydroperoxide and t-butyl hydroperoxide; organic peroxides such as benzoyl peroxide, acetyl peroxide, lauroyl peroxide, peracetic acid, and perbenzoic acid (sometimes activated by a water-soluble reducing agent such as a ferrous compound or sodium bisulfite); as well as other free-radical producing materials such as 2,2'-azobisisobutyronitrile. Polymers made by other methods of initiation such as the use of irradiation with Ultra Violet light, Ultrasonic, Gamma or mechanical means to induce free-radical generation are deemed to be within the scope of this invention. Polymers made by other polymerization methods, such as solution polymerization in water or in organic solvents, and suspension polymerization, initiated by free radical, anionic or cationic means, are also within the scope of this invention.

Depending on the solubility of the monomer containing the retentive ligand, a macromolecular organic compound having a hydrophobic cavity may be utilized in the process of making the polymer to transport the monomer through the aqueous medium during the polymerization. Suitable macromolecular organic compounds include cyclodextrin, cyclodextrin derivatives, cycloinulohexose, cycloinuloheptose, cycloinuloctose, calyxarene and cavitand. Cyclodextrin includes $\alpha$-cyclodextrin, $\gamma$-cyclodextrin and $\beta$-cyclodextrin. Cyclodextrin derivatives include the methyl, triacetyl, hydroxypropyl and hydroxyethyl derivatives of $\alpha$-cyclodextrin, $\beta$-cyclodextrin and $\gamma$-cyclodextrin. Preferred are $\alpha$-cyclodextrin, $\gamma$-cyclodextrin and $\beta$-cyclodextrin. More preferred are the methyl, triacetyl, hydroxypropyl and hydroxyethyl derivatives of $\alpha$-cyclodextrin, $\gamma$-cyclodextrin and $\beta$-cyclodextrin. The amount of macromolecular organic compound having a hydrophobic cavity used is typically from 0 to 50 weight percent, preferably 0 to 30 weight percent, more preferably 0 to 10 weight percent based on the total composition to be reacted.

Chain transfer agents may be used to control the molecular weight of the polymer. Suitable chain transfer agents are mercaptans, such as, for example, dodecylmercaptan, methyl mercaptopropionate, and mercaptopropionic acid. The chain transfer agent may be used at from 0.05% to 10% based on the total weight of the polymeric composition.

Separation media suitable for use in EC must be capable of generating electroosmotic flow (i.e., the liquid phase mass transport effected by the migration of ions in an electric field). Accordingly, the polymers of the present invention must contain ion-generating, centers, which are provided by the inclusion of monomer units containing at least one ionizable functionality. The charged groups on these monomers can be either positively charged or negatively charged. The amount of ionizable monomer as polymerized units in the polymer of the present invention is typically 5 to 80 percent by weight, preferably 10 to 60 percent by weight, more preferably 20 to 50 percent by weight.

Examples of suitable negatively charged monomers include acrylic acid, (meth)acrylic acid, crotonic acid, phosphoethyl (meth)acrylate, 2-acrylamido-2-methyl-1-propanesulfonic acid, sodium vinyl sulfonate, itaconic acid, fumaric acid, maleic acid, monomethyl itaconate, monomethyl fumarate, monobutyl fumarate, maleic anhydride, and phosphoethoxyl(meth)acrylate. Examples of suitable positively charged monomers include dimethylaminoethyl (meth)acrylate, 2-trimethylammoniomethyl (meth)acrylate chloride, diethylaminoethyl (meth)crylate, and dimethyl diallyl ammonium chloride, vinyl pyridine, hydroxyethyl (meth)acrylate, and hydroxypropyl(meth)acrylate.

In EC, as in other forms of chromatography, the separation of various solutes is achieved via the solutes' unique affinities toward retentive ligands that have been grafted onto the substrate of the separation media. Chromatographic separation media typically employ hydrophobic alkyl chains, such as $C_{18}$ alkyls, as the retentive ligand. However, other retentive ligand and systems are known. For example, aromatics and liquid crystal materials are known to act as effective retentive ligands for the separation of natural products as described in art such as K. Jinno et al., *J. Chromo.* 557 (1991) 459–468. Additionally, chiral phases such as cylcodextrins, calixarenes, vancomycin, and cellulose can effect separation of enantiomers when used as retentive ligands as described in art such as K. L. Rundlett and D. W. Armstrong, *Anal. Chem.* 1995, 67, 2088–2095. We intend the term "retentive ligand" to encompass its broadest possible scope, including all ligands known to be useful as retention centers in chromatographic applications.

The monomers containing the retentive ligand must be ethylenically unsaturated to permit incorporation into the polymer chain. Suitable monomers include, but are not limited to, $\alpha,\beta$-ethylenically unsaturated monomers such as primary alkenes; styrene and alkylsubstituted styrene; $\alpha$-methyl styrene; vinyltoluene; vinyl esters of $C_3$–$C_{30}$ carboxylic acids, such as vinyl 2-ethylhexanoate, vinyl neodecanoate and the like; vinyl chloride; vinylidene chloride; N-alkyl substituted (meth)acrylamide such as octyl acrylamide and maleic acid amide; vinyl alkyl or aryl ethers with ($C_3$–$C_{30}$) alkyl groups such as stearyl vinyl ether; ($C_3$–$C_{30}$) alkyl esters of (meth)acrylic acid, such as methyl methacrylate, ethyl (meth)acrylate, butyl (meth)acrylate, 2-ethylhexyl (meth)acrylate, benzyl (meth)acrylate, lauryl (meth)acrylate, oleyl (meth)acrylate, palmityl (meth) acrylate, stearyl (meth)acrylate; unsaturated vinyl esters of (meth)acrylic acid such as those derived from fatty acids and fatty alcohols; multifunctional monomers such as pentaerythritol triacrylate; monomers derived from cholesterol; and the like. The hydrophobic monomers may also contain functionality, such as hydroxy, amido, aldehyde, ureido, polyether and the like. Surfactant monomers including long chain alkoxy- or alkylphenoxy(polyalkylene oxide) (meth)acrylates, such as $C_{18}H_{37}$-(ethylene oxide)$_{20}$ methacrylate and $C_{12}H_{25}$-(ethylene oxide)$_{23}$, methacrylate; and the like are also included. The amount of monomer containing a retentive ligand as polymerized units in the polymer of the present invention is typically 0.1 to 50 percent by weight, preferably 1 to 20 percent by weight, more preferably 1 to 15 percent by weight.

The polymer compositions of the present invention further contain, as polymerized units, a certain amount of nonionic monomer. By nonionic monomer we mean a monomer that does not contain a positive or negative charge when in aqueous solution. The nonionic monomers of this invention have carbon chains that are less than 11 carbon units in length. The amount of nonionic monomer as polymerized units in the polymer of the present invention is typically 10 to 80 percent by weight, preferably 35 to 70 percent by weight, more preferably 40 to 65 percent by weight. Suitable nonionic monomers include $C_1$–$C_{10}$ alkyl and $C_2$–$C_8$ hydroxyalkyl esters of acrylic and (meth)acrylic acid including ethyl (meth)acrylate, methyl (meth)acrylate, 2-ethylhexyl acrylate, butyl (meth)acrylate, 2-hydroxyethyl acrylate, 2-hydroxybutyl (meth)acrylate, styrene, vinyltoluene, t-butyl styrene, isopropylstyrene, and p-chlorostyrene; vinyl acetate, vinyl butyrate, vinyl caprolate, acrylonitrile, methacrylonitrile, butadiene, isoprene, vinyl chloride, vinylidene chloride, and the like. Preferred are ethyl (meth)acrylate, methyl (meth)acrylate, 2-ethylhexyl acrylate, butyl (meth)acrylate, 2-hydroxyethyl acrylate, and 2-hydroxybutyl (meth)acrylate. More preferred are ethyl acrylate, methyl acrylate, and butyl acrylate.

Polymeric gels used in EC applications preferably provide an interconnected porous network. This allows for the generation of optimum electroosmotic flow because only the lower mass ions can electrophorese through the interconnected porous network. Conventional wisdom in the art of polymer gels used in EC, reflected in the teaching of U.S. Pat. No. 5,647,979, relies on crosslinking to provide the interconnected porous network.

Our invention completely avoids the inconveniences and complications associated with dispersing a crosslinked polymer in a capillary, by using the entanglement of non-crosslinked polymer to provide the interconnected porous network that optimizes electroosmotic flow. Polymers become entangled when their chains can physically interpenetrate and/or overlap. This interpenetration results in higher viscosity and the formation of what one generally calls polymer networks. When polymers don't overlap, but begin to encroach on each other's space, the "entanglement threshold" (or semi-dilute concentration region) is said to have been reached.

In addition to providing an interconnected porous network within the polymer gels of the present invention, entanglement further provides a means for securely dispersing the gel within the capillary. An entangled polymer does not freely electrophorese out of the capillary because its transport is very slow and highly unfavorable. The less entangled the polymer, the more freely it will electrophorese out of the capillary.

The entanglement of the polymer is generated spontaneously after filling the capillary with polymer solution at or above the entanglement threshold concentration. As is generally known in the art, entanglements can be measured with quasi-elastic light scattering measurements, neutron and small-angle X-ray diffraction, and implied from viscosity and other rheological measurements.

In EC applications solvent compatibility requirements exist for polymer gels. The support material is a polymer chain and the polymer chain must be soluble in the carrier solution for ease of use. This places a more limited solvent range on the EC system as opposed to the packed bed configuration where solubility is usually not an issue for the support. We have found that acetonitrile/water systems can be effectively used with the polymers of the present invention. The pH of the EC liquid phase is preferably controlled via buffer to maintain polymer solubility within limits of sample compatibility.

EXAMPLES

EC separations were conducted at pH 9.1, and pH 11.3. The pH 9.1 buffer is composed of 10 mM sodium tetraborate decahydrate in the acetonitrile/water mixture. The pH 11.3 buffer is made with sodium phosphate dibasic and sodium phosphate tribasic and then diluted to the final organic concentration with HPLC grade acetonitrile from J. T. Baker (Phillipsburg, N.J.). All of the analytes are purchased from Aldrich Chemical Company and used without further purification.

A Hewlett Packard (Wilmington, Del.) 3D capillary electrophoresis system is used for all experiments. Fused silica capillary tubing (50$\mu$ID) is obtained from J&W Scientific (Folsom, Calif.). Unless otherwise specified, all capillary lengths are 50 cm resulting in a distance of 42 cm between injector and detector. All experiments are conducted with the temperature set to 25° C. The injection end of the capillary is electrically positive with respect to the polarity at the detection end. Hence, the analytes are convectively driven towards the detector by electroosmosis of the positively charged acid protons. The instrument is operated in the constant voltage mode with typically 30 kV applied across the capillary, resulting in a typical field strength of 600 V cm$^{-1}$ unless otherwise specified. The detector is set at 200 nm with a reference wavelength of 225 nm and a response time of 0.1 second. Electrokinetic injection of the sample is at 1 kV for 30 seconds unless otherwise specified. Prior to each set of runs, the capillary is rinsed with buffered polymer solution for 30 to 60 minutes. The migration times and peak width at half-height are determined with the HP ChemStation software using an average of at least three replicate injections. The reproducibility of migration times was typically less than 1% relative standard deviation.

Example 1

A polymer composed of 40% ethyl acrylate, 50% methacrylic acid, and 10% lauryl methacrylate, was synthesized by emulsion polymerization using methyl-β-cyclodextrin as a phase transport catalyst. The polymerization was carried out in a reaction flask equipped with a mechanical stirrer, temperature control device, condenser, monomer and initiator feed lines and a nitrogen inlet. Deionized water (570 gram), sodium lauryl sulfate (5.4 grams) and methyl-β-cyclodextrin (3.1 gram) were introduced into the reaction flask at room temperature. The content was heated to 83° C. while stirring under a nitrogen purge. The monomer emulsion was prepared by homogenization of deionized water (405 gram), sodium lauryl sulfate (5.4 gram), and monomers (268 gram of ethyl acrylate, 67 gram of lauryl methacrylate and 335 gram of methacrylic acid) at room temperature. At 83° C., ammonium persulfate (0.7 gram) dissolved in water (6 gram) was introduced into the reaction flask. The monomer emulsion was co-fed into the reaction flask over 100 minutes together with an initiator solution consisting of ammonium persulfate (0.3 gram) in water (100 gram). At the end of the feed, the reaction mixture was held at 83° C. for 15 minutes followed by cooling under ambient conditions.

An ultrafiltration device from Amicon (Beverly, Mass.) equipped with a 10,000 Dalton cutoff filter is used to remove any low molecular weight additives and impurities that are present in the latex. The polymeric material is rinsed and filtered three times to reduce these impurities approximately 1000-fold. The resulting purified polymer solution is freeze-dried with a Labconco (Kansas City, Mo.) freeze dryer to give a solid, which is stored until needed. The water used for these processes and the electrochromatography buffers is obtained from a Milli-Q water system (Millipore Corporation, Milford, Mass.).

The polymer is prepared for electrochromatography by adding it in the solid form directly to the buffer solutions at the various reported concentrations.

Example 2

A mixture of 1) methyl-, 2) ethyl-, 3) propyl-, and 4) butyl benzoate was separated in an EC column using the polymer of Example 1 at concentrations of 0%, 98%, 1.97%, 3.11%, and 3.72% by weight. The solvent conditions are 40%:60% acetonitrile/water at pH 11.3. The run-time voltage is 30 kV with an electrokinetic injection of 5 kV for 15 seconds.

The results are shown in FIG. 1. As can be seen from FIG. 1A, no separation is obtained at zero polymer concentration. At this concentration the solute elutes at approximately 4.35 minutes with an electroosmotic velocity of 0.161 cm sec$^{-1}$. Little separation is noted to occur in FIG. 1B where the polymer concentration, $C_p$, is 0.98% by weight. However, it can be seen that now the elution time is shorter due to the presence of enhanced electroosmotic flow. If the first negative peak is used as an indication of the fluid velocity, then the electroosmotically driven fluid velocity is now 0.226 cm sec$^{-1}$. This demonstrates that the polymer does cause electroosmotic flow to occur above that exhibited by the capillary wall electroosmosis.

Further resolution is noted to occur when $C_p$=1.97%, as shown in FIG. 1C. Also shown in this figure is the reduction in electroosmotic flow velocity (0.209 cm sec$^{-1}$) as compared to that shown in FIG. 1B. The resolution increases as $C_p$ is increased from 3.11% to 3.72%, as shown in FIGS. 1D and 1E. Additionally, the electroosmotic flow velocity, as judged by the system peak elution time, decreases further. In the peaks shown in FIG. 1E, there is full baseline resolution in less than 5 minutes. The peak widths are particularly small. In the separation shown in FIG. 1E the peak width at half height for butyl benzoate (the most retained peak) is 1.93 seconds which is a Gaussian standard deviation of 0.822 seconds. For a retention time of 4.807 minutes, the number of theoretical plates is approximately 123,000 or approximately 293,000 plates per meter.

System peaks are present in the electrochromatograms shown in FIG. 1 as the first and second peaks. These peaks have their origins in the displacement of equilibrated solvent on the retentive phase and are affected by the solvent mixture composition and by the strength of the retention of solute peaks.

Example 3

A mixture of 1) acetophenone, 2) butyrophenone, 3) hexanophenone, and 4) octanophenone was separated using the polymer of Example 1. The conditions are 5 kV injection for 15 seconds, 4.00% polymer retentive phase, run voltage is 30 kV. The solvent is 40% acetonitrile at pH 9.1. The injection concentration of each compound is 400 ppm.

Figure 2:
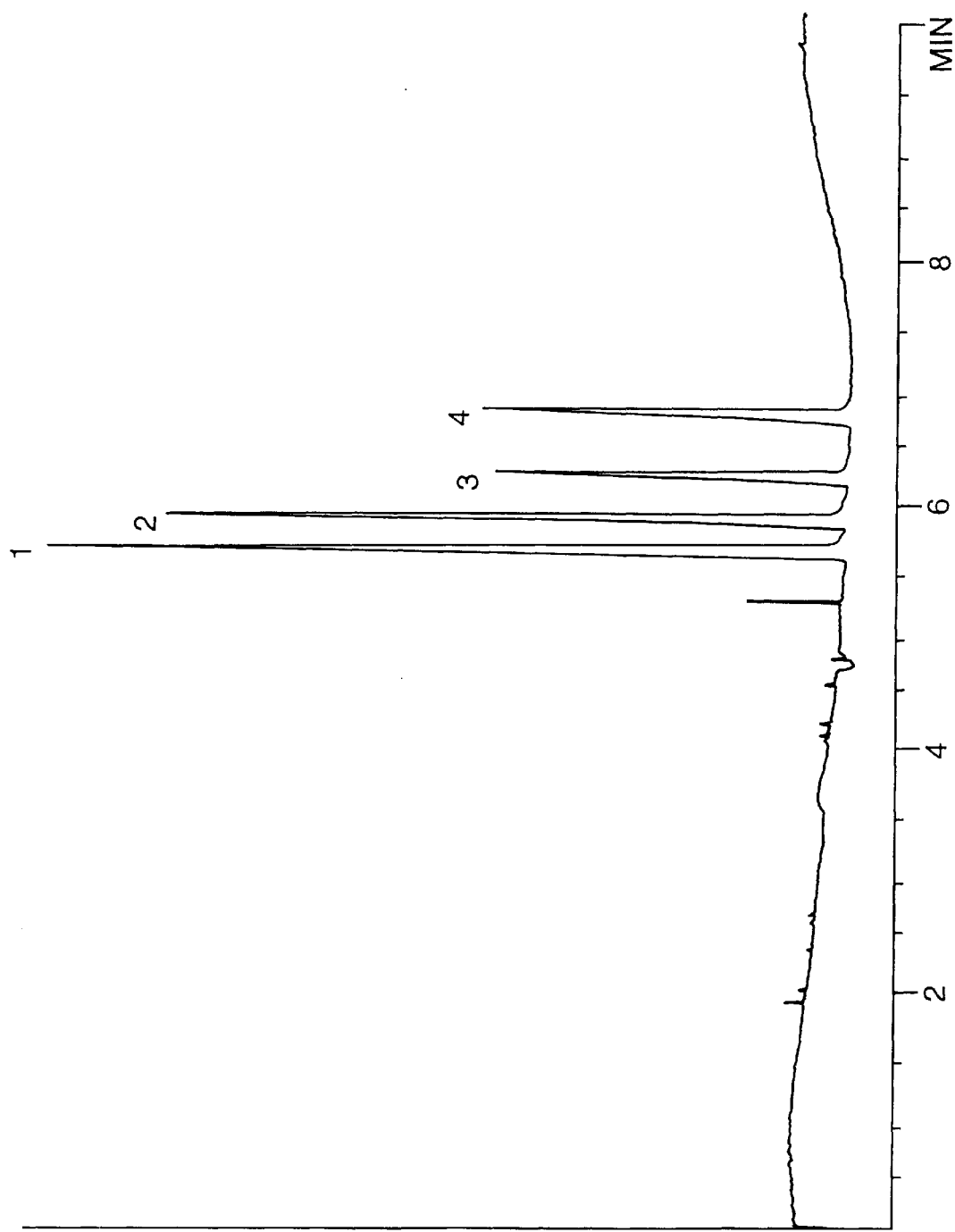
FIG. 2 illustrates the electrochromatographic separation of four additional solutes using a polymer separation medium within the scope of the present invention.

The results are shown in FIG. 2. The retention times are slightly longer than those shown for the benzoates in FIG. 1 because the polymer concentration is slightly higher and under these conditions the electroosmotic flow velocity is slightly lower and retention is higher. This experiment is also conducted at the lower pH, which has a slightly lower electroosmotic flow velocity.

Example 4

A mixture of 1) toluene, 2) ethyl benzene, 3) propyl benzene, and 4) butyl benzene is separated using the polymer of Example 1. The conditions are 1 kV injection for 15 seconds, 4.00% polymer retentive phase, run voltage is 30 kV. The solvent is 40% acetonitrile at pH 9.1. The injection concentration of each compound is 1000 ppm.

Figure 3:
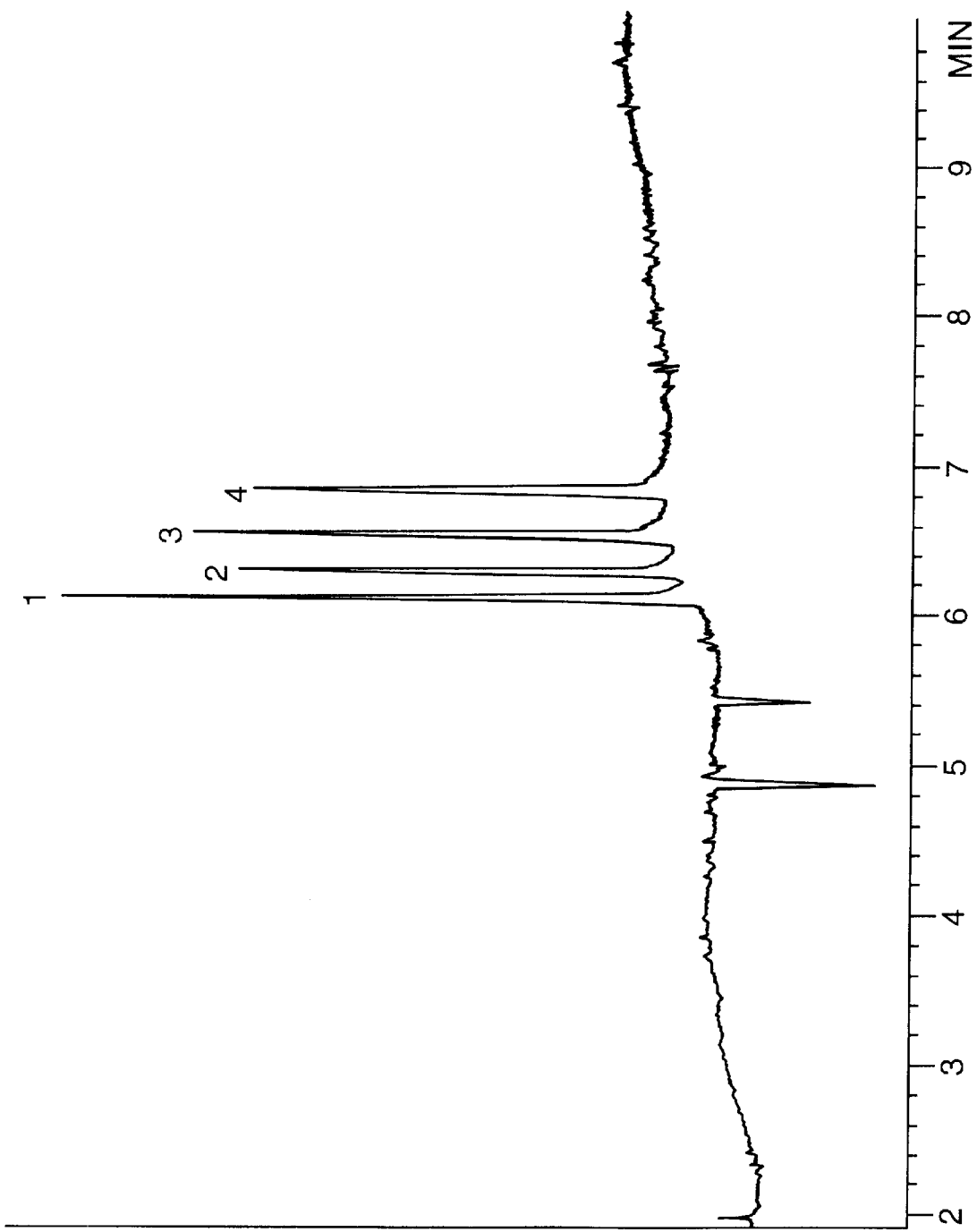
FIG. 3 illustrates the electrochromatographic separation of four additional solutes using a polymer separation medium within the scope of the present invention.

The results are shown in FIG. 3. Again, the resolution is fine and the separation is easy to perform.

Example 5

A mixture of 1) hydroxyquinone, 2) p-methoxy phenol, 3) phenothiazine, and 4) butylated hydroxy toluene was separated using the polymer of Example 1. The conditions are 1 kV injection for 15 seconds, 4.03% polymer retentive phase, run voltage is 30 kV. The solvent is 40% acetonitrile at pH 9.1. The injection concentration of each compound is 1000 ppm.

Figure 4:
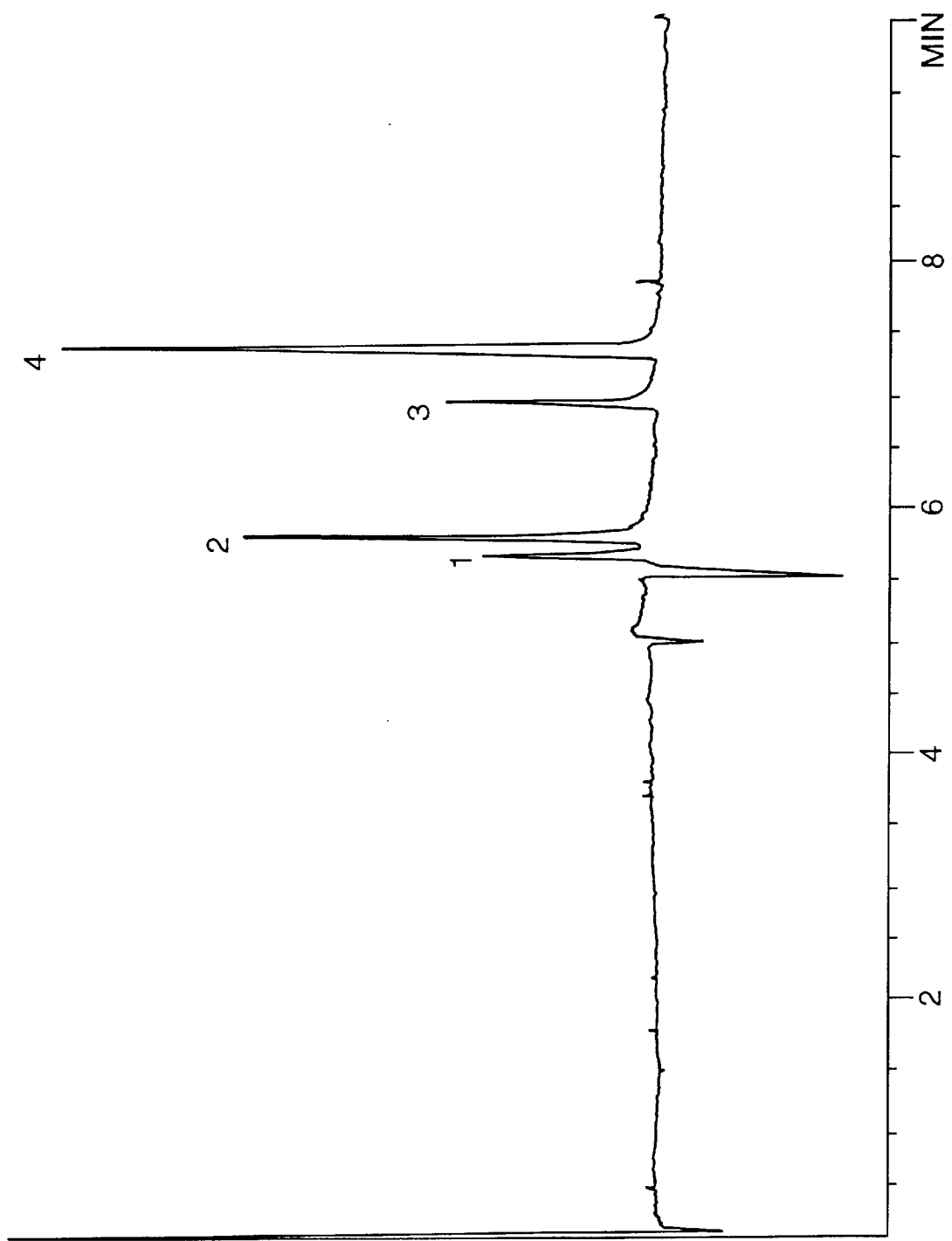
FIG. 4 illustrates the electrochromatographic separation of four additional solutes using a polymer separation medium within the scope of the present invention.

The results are shown in FIG. 4. The separation is easily done and is competitive with other fast chromatographic methods.

Example 6

A mixture of polycyclic aromatic hydrocarbons was separated using the polymer of Example 1 at pH 9.2 and pH 11.5. The 9.2 pH buffer is made with 10 mM sodium borate decahydrate and the 11.5 pH buffer is made with 10 mM phosphate. The polymer concentration is 3.99% for the pH 9.20 run, and is 4.01% for the pH 11.5 run. In both cases the solvent was 40% acetonitrile. In both cases a 20 kV potential is placed across a 33 cm length of capillary (the electric field strength is 606 V cm$^{-1}$) with 25 cm between injector and detector.

Figure 5A:
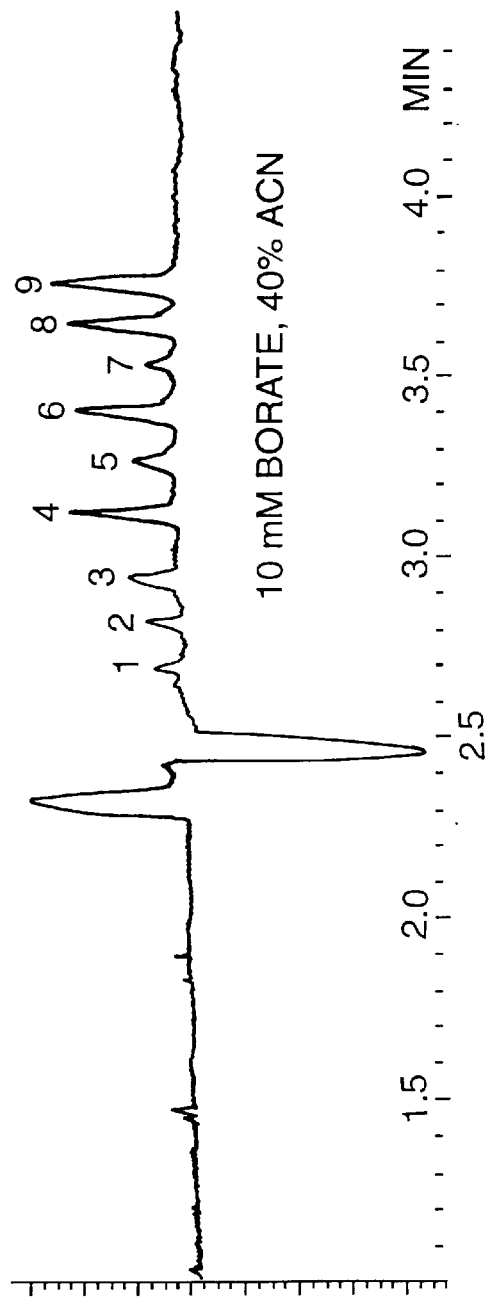
FIGS. 5A and 5B illustrate the electrochromatographic separation, at different pH values, of a mixture of polycyclic aromatic hydrocarbons using a polymer separation medium within the scope of the present invention.
Figure 5B:
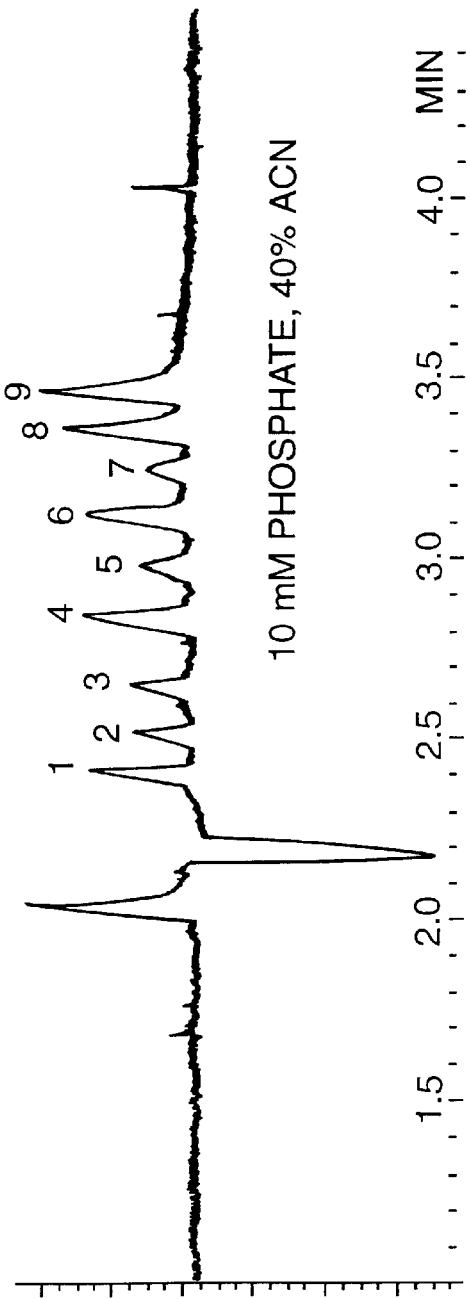

The results are shown in FIG. 5. Peaks are 1) benzene, 2) unknown impurity, 3) napthalene, 4) fluorene, 5) anthracene, 6) pyrene, 7) chrysene, 8) benzo(e)pyrene, and 9) benzo(ghi)perylene. Resolution in both cases appears to be excellent and very little difference is seen between the two experiments.

Example 7

FIG. 6 shows the effect of field strength on the separation of the polycyclic aromatic hydrocarbon mixture at pH 9.20 of Example 6. The mixture was separated with three different operating voltages: 10 kV, 20kV, and 30 kV. These result in electric fields of 303 V cm$^{-1}$, 606 V cm$^{31\ 1}$ and 909 V cm$^{-1}$ respectively. The capillary is the same as that used for Example 6. The resolution is nearly constant between the 10 kV, 20 kV, and 30 kV experiments.

We claim:

1. A method of capillary electrochromatography, wherein a capillary electrochromatographic separation is performed using the following polymer solution as a separation medium: the polymer solution containing at least one substantially non-crosslinked polymer comprising
    (i) from about 5 to 80 weight percent of at least one ethylenically unsaturated monomer containing an ionizable functional group;
    (ii) from about 0.1 to 50 weight percent of at least one ethylenically unsaturated monomer containing a retentive ligand comprising an organic moiety of at least $C_3$; and
    (iii) from about 10 to 80 weight percent of at least one ethylenically unsaturated nonionic monomer.

2. The method of claim 1 wherein the ionizable functional group of the ethylenically unsaturated monomer containing an ionizable functional group (i) is selected from carboxylic acids, amines, sulfates, sulfonates, hydroxides, pyridine bases, phosphoric acids, and salts of the above.

3. The method of claim 2 wherein the ethylenically unsaturated monomer containing an ionizable functional group (i) is selected from carboxylic acid monomers of the formula

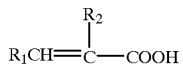

where
    $R_1$ is H, $CH_3$, or COOX;
    $R_2$ is H, ($C_1$–$C_4$) alkyl, or $CH_2$COOX; and
    X is H or ($C_1$–$C_{22}$) alkyl.

4. The method of claim 3 wherein the ethylenically unsaturated nonionic monomer (iii) is selected from monomers of the formula

where
    Y is —H, —$CH_3$, or —Cl;
    Z is —COOR$_3$, —CN, —Cl, —CR$_3$, —C$_6$H$_4$R$_4$,

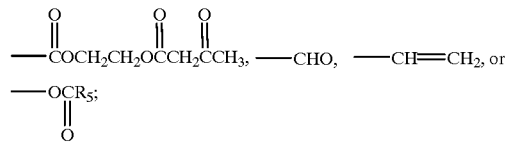

$R_3$ is ($C_1$–$C_{10}$) alkyl or ($C_2$–$C_8$) hydroxyalkyl;
$R_4$ is —H, —Cl, —Br, or ($C_1$–$C_{10}$) alkyl; and
$R_5$ is ($C_1$–$C_{10}$) alkyl.

* * * * *